July 8, 1947.  P. ENDEBAK  2,423,642

DIAPHRAGM SHAFT SEAL

Filed Aug. 31, 1944

INVENTOR
Peter Endebak
Clarence F. Poole
ATTORNEY

Patented July 8, 1947

2,423,642

UNITED STATES PATENT OFFICE 2,423,642

DIAPHRAGM SHAFT SEAL

Peter Endebak, Chicago, Ill., assignor to Tuthill Pump Company, Chicago, Ill., a corporation of Illinois Application August 31, 1944, Serial No. 552,122

3 Claims. (Cl. 286—11)

1

This invention relates to improvements in seals for rotating shafts or the like, and more particularly to seals of the flexible diaphragm type, and has for its principal object to provide a simple and efficient structure of the character described.

The invention may best be understood by reference to the accompanying drawing, in which.

Figure 1:
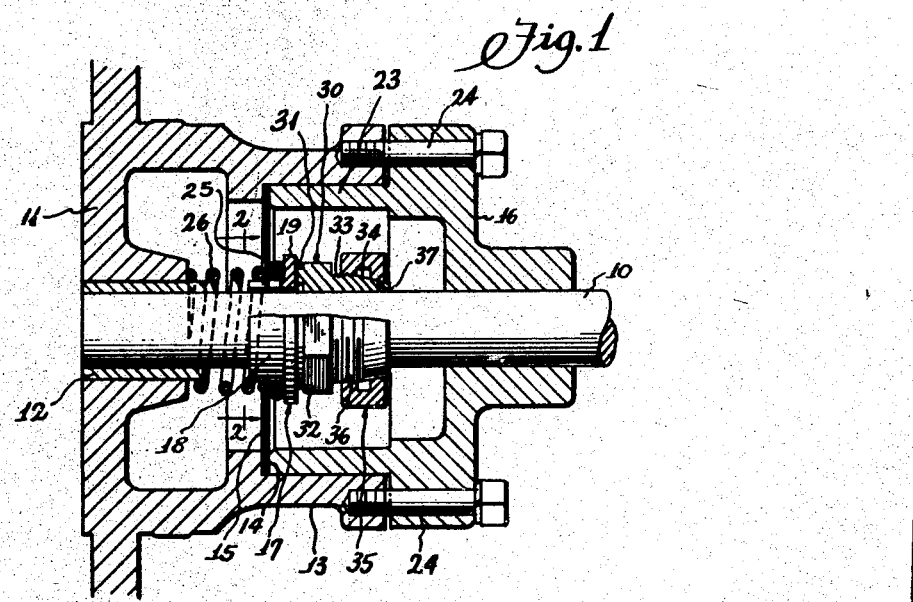
Figure 1 is a transverse section of a seal structure constructed in accordance with my invention, with certain parts shown in full.
Figure 2:
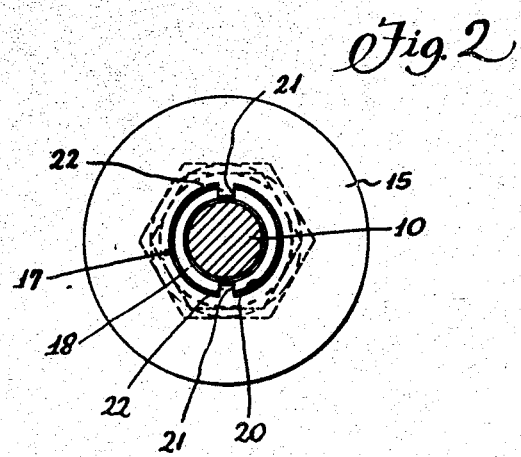
Figure 2 is a detail section taken on line 2—2 of Figure 1.

Referring to the details of the embodiment of my invention shown in the drawing, 10 indicates a shaft, and 11 indicates a pump or similar casing having a journal bearing 12 and extended seal housing 13. Intermediate the ends of the housing 13 is an outwardly facing annular shoulder 14 forming a seat for a diaphragm 15. The housing is adapted to be enclosed at its outer end by a detachable end cap 16, which has a telescoping inner end portion 23 for securing the periphery of the diaphragm 15 in fluid-tight seated relation against the shoulder 14. The cap 16 may be secured to the housing 13 by cap screws 24.

A thrust collar 17 is loosely mounted on the shaft, and includes a cylindrical inner end portion 18 and a flanged central outer portion 19. The inner portion 18 fits in an aperture 20 in the diaphragm and is provided with a plurality of longitudinal slots 21, 21, herein two in number, extending from the inner end thereof, and in which tongues 22, 22 formed integrally with the diaphragm extend to restrain rotation of the thrust collar, but permit limited movement of the latter along the shaft.

An annular sealing ring 25, of suitable material and preferably of synthetic rubber such as Neoprene, is mounted on the cylindrical portion 18 of the thrust collar, in endwise abutting relation between the flanged portion 19 and the diaphragm 15. A coil spring 26 surrounds the shaft and the inner end of the cylindrical portion 18 with its inner end seated on the pump casing 11 and its outer end on the diaphragm 15 so as to urge the latter yieldingly toward the right, as seen in Figure 1.

A bearing collar 30 is suitably fixed on the shaft in endwise abutting relation with the thrust collar. In the form shown herein, the bearing collar 30 has an annular bearing surface 31, an enlarged hexagonal intermediate portion 32, a threaded portion 33 and a tapered outer end portion 34. Said collar is designed to be clamped upon the shaft by a hexagonal locking nut 35,

2 having a threaded bore 36 at its inner end, and a tapered aperture 37 at its outer end for engaging the tapered portion 34 of the bearing collar 30. The arrangement is such that by tightening the locking nut 35 on the bearing collar 30, the tapered end of the latter will be clamped on the shaft at any adjusted position therealong, with the bearing collar held in rotatable engagement against the thrust collar 17 under the yielding compression of spring 26.

Since the thrust collar 17 is restrained from rotation by the tongues 22, 22 of the diaphragm 15, the sealing ring 25 is also restrained from rotation and forms a fluid-tight joint between said diaphragm and the flanged portion 19 of said thrust collar.

Although I have shown and described certain embodiments of my invention, it will be understood that I do not wish to be limited to the exact construction shown and described, but that various changes and modifications may be made without departing from the spirit and scope of the invention as defined in the appended claims.

I claim:

1. In a seal for a rotatable member, a housing member, a flexible diaphragm having its periphery fixed with respect to said housing member and surrounding said rotatable member, a thrust collar loosely mounted on said rotatable member in slidable but non-rotative engagement with said diaphragm, said thrust collar having a radially extending shoulder in spaced relation to said diaphragm, an annular sealing member detachably surrounding a cylindrical portion of said thrust collar and interposed between said diaphragm and the shoulder on said thrust collar, and an annular bearing collar detachably mounted on said rotatable member in rotatable engagement with the outer face of said thrust collar and maintaining said annular sealing member under yielding compression between said diaphragm and the shoulder on said thrust collar.

2. In a seal for a rotatable member, a housing member, a flexible diaphragm having its periphery fixed with respect to said housing member and surrounding said rotatable member, a thrust collar loosely mounted on said rotatable member and having a tongue and groove connection with said diaphragm affording axially slidable but non-rotative engagement with said diaphragm, said thrust collar having a radially extending shoulder normally in spaced relation from said diaphragm, an annular sealing member detachably surrounding a cylindrical portion of said thrust collar and interposed between said diaphragm and the shoulder on said thrust collar, and an annular bearing collar detachably mounted on said rotatable member in rotatable engagement with the outer face of said thrust collar and maintaining said annular sealing member under yielding compression between said diaphragm and the shoulder on said thrust collar.

3. In a seal for a rotatable member, a housing member, a flexible diaphragm having its periphery fixed with respect to said housing member and surrounding said rotatable member, a thrust collar loosely mounted on said rotatable member in slidable but non-rotative engagement with said diaphragm, said thrust collar having a radially extending shoulder in spaced relation from said diaphragm, an annular sealing member detachably surrounding a cylindrical portion of said thrust collar and interposed between said diaphragm and the shoulder on said thrust collar, an annular bearing collar detachably mounted on said rotatable member in rotatable engagement with the outer face of said thrust collar and maintaining said annular sealing member under yielding compression between said diaphragm and the shoulder on said thrust collar, and a coil spring interposed between said housing member and said diaphragm on the side opposite said sealing member, and in substantial registry with the latter.

PETER ENDEBAK.

REFERENCES CITED

The following references are of record in the file of this patent:

UNITED STATES PATENTS

| Number | Name | Date |
| --- | --- | --- |
| 2,051,301 | Kleckner et al. | Aug. 18, 1936 |
| 2,163,127 | Limpert | June 20, 1939 |
| 1,598,564 | Earnshaw | Aug. 31, 1926 |
| 2,216,218 | Wahlmark | Oct. 1, 1940 |
| 2,249,930 | Bailey et al. | July 22, 1941 |

FOREIGN PATENTS

| Number | Country | Date |
| --- | --- | --- |
| 245,548 | Great Britain | 1926 |